(12) United States Patent
Brand et al.

(10) Patent No.: US 8,116,036 B2
(45) Date of Patent: Feb. 14, 2012

(54) CORROSION INHIBITOR INCORPORATED IN CARBON OVERCOATS

(75) Inventors: John L. Brand, Burnsville, MN (US); Brian W. Karr, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 260 days.

(21) Appl. No.: 12/503,312

(22) Filed: Jul. 15, 2009

(65) Prior Publication Data

US 2011/0014497 A1 Jan. 20, 2011

(51) Int. Cl.
*G11B 5/127* (2006.01)

(52) U.S. Cl. .................................... 360/235.1
(58) Field of Classification Search ............... 360/235.1, 360/234, 234.7, 235.2, 235.3, 235.8; 29/603.03, 29/603.16
See application file for complete search history.

(56) References Cited

U.S. PATENT DOCUMENTS

| | | | |
|---|---|---|---|
| 5,023,738 A | 6/1991 | Prenosil | |
| 5,909,337 A | 6/1999 | Tyndall, III | |
| 6,194,360 B1 | 2/2001 | Karis et al. | |
| 6,643,093 B2 | 11/2003 | Brown et al. | |
| 6,762,909 B2 | 7/2004 | Albrecht et al. | |
| 6,876,509 B2 * | 4/2005 | Bonin et al. | 360/75 |
| 6,916,955 B2 * | 7/2005 | Dai et al. | 562/586 |
| 6,932,890 B2 * | 8/2005 | Dai et al. | 204/192.15 |
| 6,940,692 B2 * | 9/2005 | Dai et al. | 360/125.72 |
| 6,967,818 B2 | 11/2005 | Baumgart et al. | |
| 7,195,828 B2 | 3/2007 | Gunsel et al. | |
| 2002/0097517 A1 * | 7/2002 | Bonin et al. | 360/75 |
| 2003/0053262 A1 * | 3/2003 | Clayton et al. | 360/266.6 |
| 2004/0021984 A1 * | 2/2004 | Dai et al. | 360/122 |
| 2004/0023033 A1 * | 2/2004 | Dai et al. | 428/408 |
| 2004/0023076 A1 * | 2/2004 | Dai et al. | 428/694 TF |
| 2006/0227458 A1 | 10/2006 | Zipperian | |
| 2008/0231992 A1 * | 9/2008 | Cheng et al. | 360/122 |

OTHER PUBLICATIONS

A. Leng, The Inhibition of the atmospheric corrosion of iron by vapour-phase-inhibitors, Corrosion Science, 1993, pp. 1657-1683, vol. 34, No. 10, Pergamon Press Ltd., Great Britain.

* cited by examiner

*Primary Examiner* — Allen Cao
(74) *Attorney, Agent, or Firm* — Braden Katterheinrich

(57) ABSTRACT

Recording heads for a data storage system include a first side having at least a portion of a metal component. A carbon overcoat is on the first side and covers the at least a portion of a metal component. A corrosion inhibitor is incorporated in the carbon overcoat. The corrosion inhibitor is illustratively located between the carbon overcoat and the at least a portion of a metal component, on top of the carbon overcoat, or within the carbon overcoat. In an embodiment, the carbon overcoat includes diamond-like carbon.

20 Claims, 4 Drawing Sheets

CORROSION INHIBITOR INCORPORATED IN CARBON OVERCOATS

BACKGROUND

Data storage systems commonly include a recording head that reads and writes information to a recording medium. Recording heads often include components that are made of metal. These components are susceptible to corrosion. If corrosion occurs, the performance of the components may be adversely affected. For example, in a magnetic recording head, corrosion of a writing element may reduce the strength of a magnetic field used to write information to the recording medium. Corrosion also has other adverse effects such as generating particulate contamination that may damage parts of a data storage system such as the recording medium.

One previous method to prevent or reduce corrosion of recording head components included covering the corrodible elements with a carbon overcoat. The carbon overcoat reduced the exposure of the corrodible elements to oxygen and water. This reduced exposure to oxygen and water reduced the likelihood of corrosion.

Carbon overcoats commonly increase the spacing or distance between the recording head read/write component or components and the recording medium. This increased spacing typically has an adverse effect on the performance of a data storage system. For example, the increased spacing may reduce the strength of a recording head writing field on a recording medium. The increased spacing may also reduce the strength of a signal read by the recording head.

SUMMARY

An aspect of the disclosure relates to incorporating a corrosion inhibitor in a carbon overcoat of a data storage system recording head. In one embodiment, recording heads include a first side having at least a portion of a metal component. A carbon overcoat is on the first side and covers the at least a portion of a metal component. A corrosion inhibitor is incorporated in the carbon overcoat. The corrosion inhibitor is illustratively located between the carbon overcoat and the at least a portion of a metal component, on top of the carbon overcoat, or within the carbon overcoat. In an embodiment, the carbon overcoat includes diamond-like carbon. These and various other features and advantages will become apparent upon reading the following detailed description and upon reviewing the associated drawings.

DETAILED DESCRIPTION

As was discussed in the background section, carbon overcoats commonly have an adverse effect on the performance of a data storage system by increasing the spacing between a recording head read/write component and a recording medium. This adverse effect can be reduced by decreasing the thickness of the carbon overcoat. Decreasing the thickness of a carbon overcoat however lessens the corrosion protection provided by the carbon overcoat. For example, a thinner carbon overcoat may be penetrable by oxygen and water. As will be discussed later in greater detail, embodiments of the present disclosure incorporate a corrosion inhibitor or inhibitors in carbon overcoats. These corrosion inhibitors provide additional protection from corrosion. This additional protection illustratively allows for the thickness of carbon overcoats to be decreased to thicknesses that may otherwise not provide suitable corrosion prevention.

Figure 1:
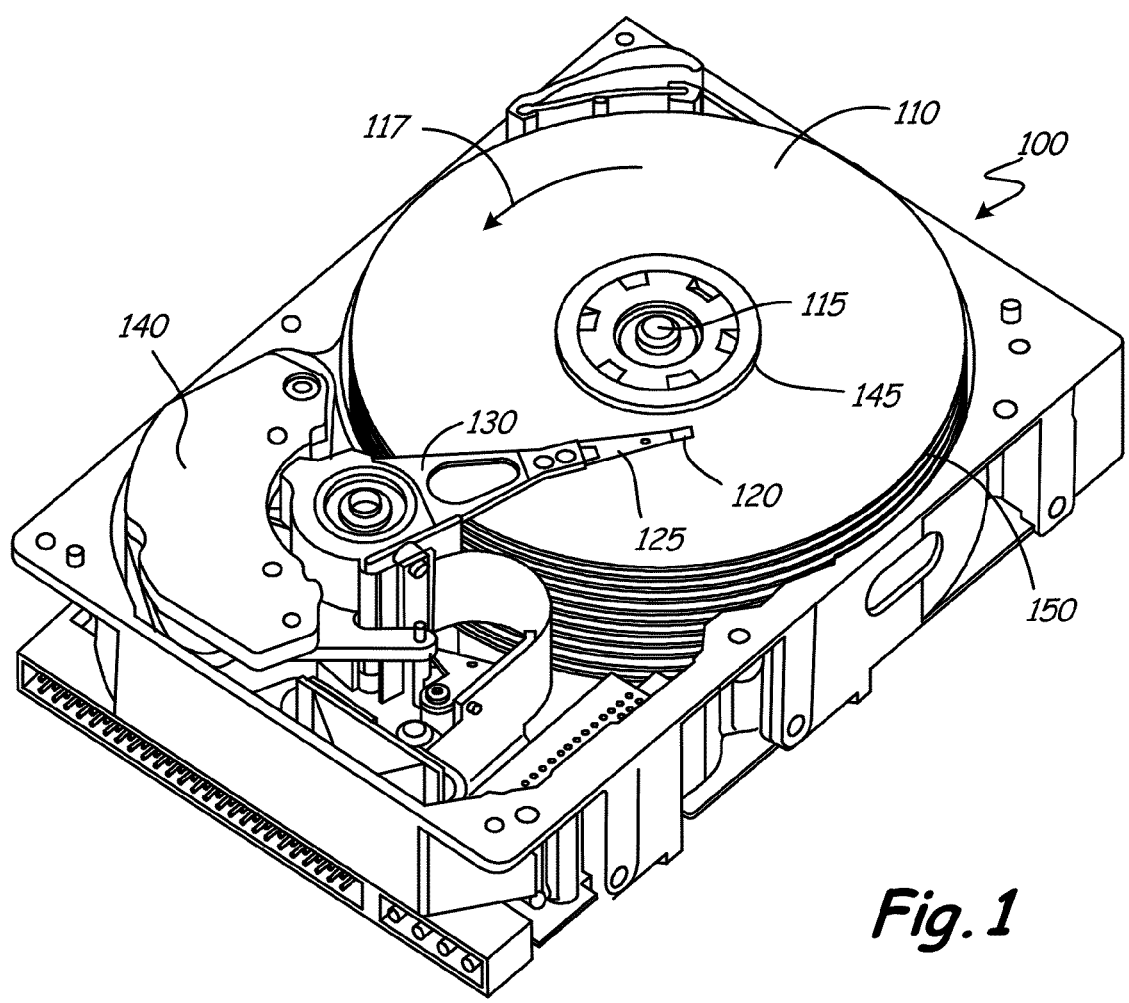
FIG. 1 is a perspective view of a hard disc drive.

Before discussing embodiments of the present disclosure, it is worthwhile to first describe an illustrative operating environment in which some embodiments may be incorporated. FIG. 1 is a perspective view of a hard disc drive 100. Hard disc drives are a common type of data storage system. While embodiments of this disclosure are described in terms of disc drives, other types of data storage systems should be considered within the scope of the present disclosure.

Disc drive 100 includes a magnetic disc or recording medium 110. Those skilled in the art will recognize that disc drive 100 can contain a single disc or multiple discs. Medium 110 is mounted on a spindle motor assembly 115 that facilitates rotation of the medium about a central axis. An illustrative direction of rotation is shown by arrow 117. Each disc surface has an associated recording head 120 that carries a read/write component or components for communication with the surface of the disc. Each head 120 is supported by a head gimbal assembly 125, which is in turn attached to an actuator arm 130. Each actuator arm 130 is rotated about a shaft by a voice coil motor assembly 140. As voice coil motor assembly 140 rotates actuator arm 130, head 120 moves in an arcuate path between a disc inner diameter 145 and a disc outer diameter 150.

Figure 2:
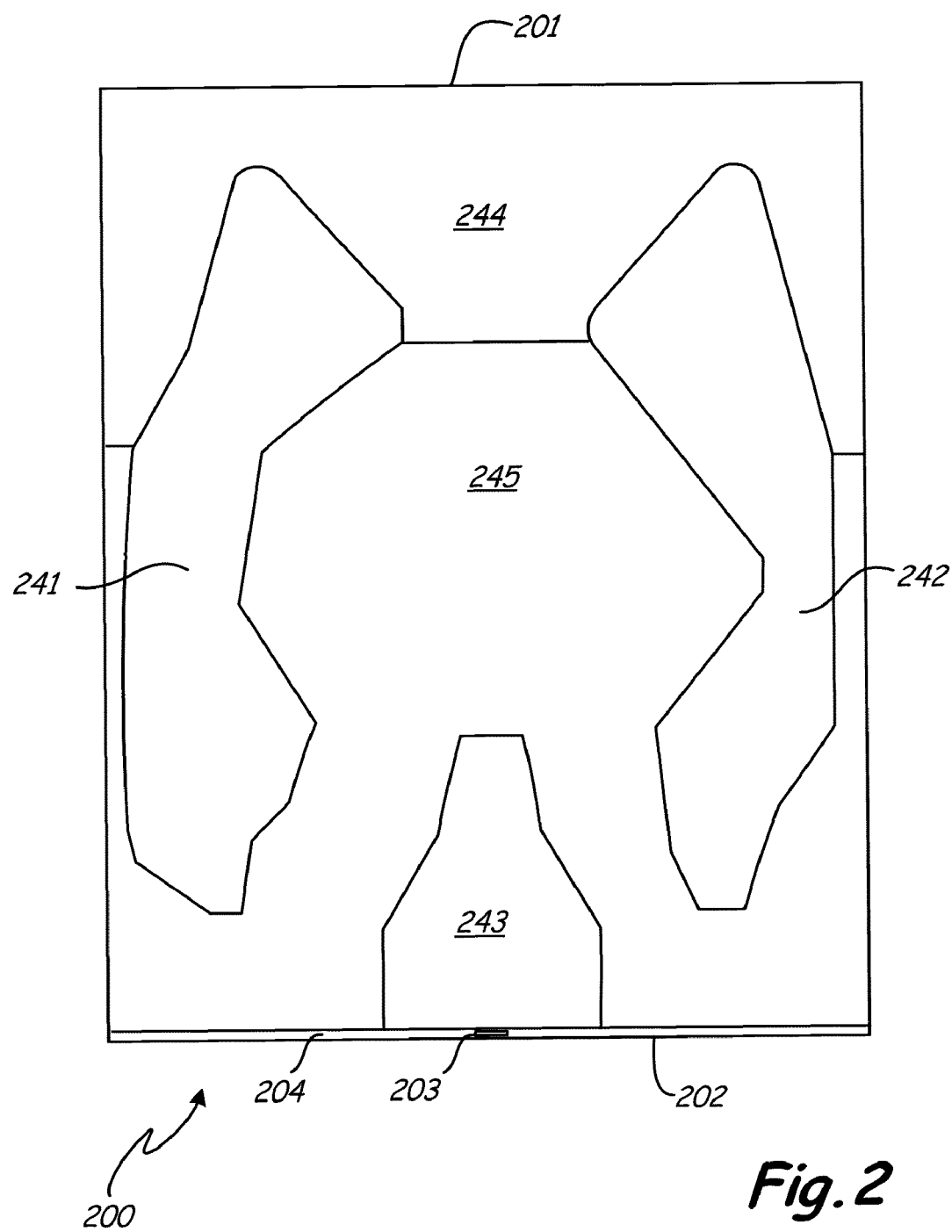
FIG. 2 is a plan view of a recording head from the air bearing surface side.

FIG. 2 is a plan view of a recording head 200 from the air bearing surface side. Recording head 200 is illustratively a recording head such as head 120 in FIG. 1 and is illustratively used in a data storage system such as drive 100 in FIG. 1. It should be noted that embodiments of the present disclosure are not limited to any particular recording head such as the specific recording head shown in FIG. 2. Embodiments of carbon overcoats with incorporated corrosion inhibitors are included in all types and configurations of recording heads.

The air bearing surface side of a recording head faces a recording medium such as medium 110 in FIG. 1. Head 200 includes a leading edge or side 201 and a trailing edge or side 202. Recording head 200 is positioned relative to a recording medium such that a particular location on the medium first passes underneath leading edge 201 and then passes underneath trailing edge 202. Recording head 200 also include read/write component or components 203. Component 203 is shown in FIG. 2 as being at or approximately at the center of trailing edge 202. Component 203 is optionally placed or positioned at any location along trailing edge 202.

Recording head 200 also includes a first side rail 241, a second side rail 242, a center pad 243, a step 244, and a cavity 245. In an embodiment, rails 241-242, pad 243, step 244, and cavity 245 are formed or defined utilizing photolithography and ion milling processes.

Air bearing surface sides of recording heads illustratively include features or surfaces at different relative heights. For example, cavity 245 may be recessed from rail 241. Embodiments of carbon overcoats incorporating corrosion inhibitors are optionally included on any one or more of these surfaces (i.e. carbon overcoats incorporating corrosion inhibitors may be included on features having different relative heights).

The air bearing surface side of a recording head, such as that shown in FIG. 2, is illustratively made of a variety of different materials. Rails 241-242, pad 243, step 244, and cavity 245 are illustratively made of or formed out of a recording head substrate material. One example of a substrate material, for illustration purposes only and not by limitation, is aluminum oxide titanium carbon. The portion or portions of read/write component 203 that are included on the air bearing surface side, or that are exposed at the air bearing surface side, are illustratively made from one or more metals or metallic materials. Recording head 200 further optionally includes a dielectric layer 204. Dielectric layer 204 runs along trailing edge 202 and forms a part of the surface of the recording head air bearing surface side. One illustrative example of a dielectric material is alumina ($Al_2O_3$).

Carbon overcoats incorporating corrosion inhibitors are optionally placed on any portion or portions of a recording head. In one embodiment, a carbon overcoat covers at least a portion of a read/write component such as component 203 in FIG. 2. In another embodiment, a carbon overcoat is placed on the entire air bearing surface side of a recording head (e.g. all of the surfaces shown in FIG. 2). In yet another embodiment, a carbon overcoat is placed on the entire air bearing surface side except for recessed features such as, but not limited to, cavity 245 in FIG. 2.

It should be noted that in addition to protecting a recording head from corrosion, that carbon overcoats also illustratively improve tribological performance. For example, carbon overcoats may reduce recording head wear. Carbon overcoats may also reduce static friction or "stiction" between a recording head and a recording medium. In an embodiment, carbon overcoats are placed on parts or portions of a recording head that are not susceptible to corrosion for these and/or other benefits associated with carbon overcoats.

Figure 3:
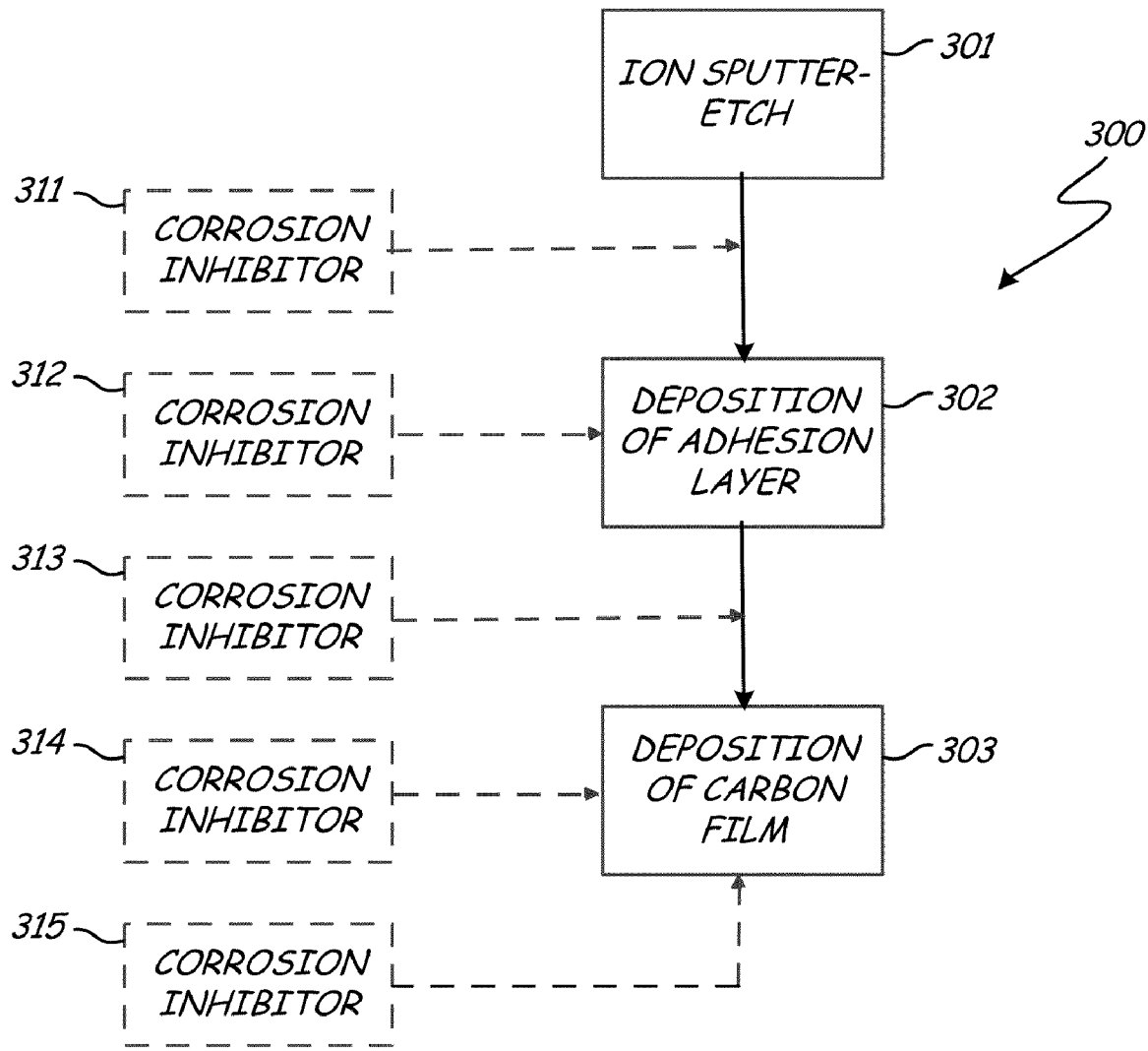
FIG. 3 is a process flow diagram of a general method of forming carbon overcoats that incorporate corrosion inhibitors.

FIG. 3 is a process flow diagram of an illustrative method 300 of forming carbon overcoats that incorporate corrosion inhibitors. Embodiments of the present disclosure are not limited to any particular method. Embodiments include variations on method 300 and methods other than method 300.

At block 301, a surface or surfaces of the recording head is ion sputter-etched. Examples of surfaces that are etched include, but are not limited to, a surface of a read/write component, a substrate surface, and/or a dielectric surface. The sputter-etch illustratively removes contaminants and/or oxide layers to improve adhesion characteristics or capacities of the surface or surfaces. Embodiments of the present disclosure are not however limited to utilizing an ion-sputter etch process for surface preparation. Embodiments include any process or technique. Other possible surface preparation processes, for illustration purposes only and not by limitation, include plasma ashing and UV ozone cleaning.

At block 302, an adhesion layer is optionally deposited. The adhesion layer allows for the following carbon layer or film to functionally adhere to the recording head. In certain embodiments, an adhesion layer is not deposited and the following carbon layer or film is directly deposited on the recording head. The adhesion layer is illustratively applied or deposited to all or a portion of the surface or surfaces etched at block 301. Embodiments of the present disclosure are not limited to any particular type of adhesion layer material. In one embodiment, for illustration purposes only and not by limitation, the adhesion layer is made of silicon or silicon carbon. In another illustrative embodiment, the adhesion layer is made of one or more corrosion inhibitors. For example, a corrosion inhibitor or inhibitors is illustratively used to replace another adhesion layer material, and the layer of corrosion inhibitors acts both as an adhesion layer (i.e. to allow the following carbon layer to adhere to the recording head) and as a layer that inhibits corrosion through a chemical or electrochemical mechanism.

At block 303, a carbon film or layer is deposited. Embodiments are not limited to any particular carbon film and include all carbon films. Certain embodiments include hydrogenated carbon films and nitrogenated carbon films. In one illustrative embodiment, the carbon film is diamond-like carbon. Diamond-like carbon (DLC) is an amorphous carbon material that includes carbon atoms bonded together through hybridized sp3 atomic orbitals. DLC comes in several variations and embodiments include all variations. One variation is known as tetrahedral amorphous carbon (ta-C). It consists only of sp3 bonded carbon atoms. Other variations include atoms other than sp3 bonded carbon atoms such as, but not limited to, hydrogen, nitrogen, graphitic sp2 carbon, and metals.

Embodiments of carbon films are not limited to any particular methods of depositing a carbon film or to any particular types of equipment. Embodiments include all methods and types of equipment. Certain embodiments, for illustration purposes only and not by limitation, include filtered or unfiltered cathodic arc deposition. Certain other illustrative embodiments include various gas deposition processes such as, but not limited to, chemical vapor deposition processes. Certain illustrative gas processes include cracking a precursor such as methane, ethane, ethylene, and acetylene.

Embodiments of adhesion layers and carbon films/layers are not limited to any thicknesses and include all thicknesses. In one embodiment, the carbon overcoat (i.e. the combination of the adhesion layer and the carbon film) is less than 20 Angstroms. In another embodiment, the carbon overcoat is between 15 and 17 Angstroms thick. In yet another embodiment, the adhesion layer is between 5 and 7 Angstroms, and the carbon film is approximately 10 Angstroms.

FIG. 3 also includes blocks 311, 312, 313, 314, 315, and corresponding arrows. These blocks and their corresponding arrows represent locations in the process in which a corrosion inhibitor or inhibitors is incorporated into the carbon overcoat. A corrosion inhibitor or inhibitors is illustratively incorporated at any one or more of these locations. Block 311 corresponds to incorporating a corrosion inhibitor after the ion sputter-etch and before the deposition of the adhesion layer (i.e. the corrosion inhibitor is located between the etched surface and the carbon overcoat). Incorporating the corrosion inhibitor at this point illustratively maximizes the adhesion of the inhibitor to surfaces such as, but not limited to, metal surfaces. In an embodiment, a corrosion inhibitor or inhibitors is used that has an electronic or electrochemical mechanism. Incorporation of such a corrosion inhibitor at this point may maximize the corrosion protection.

Block 312 corresponds to incorporating a corrosion inhibitor while the adhesion layer is being deposited (i.e. the corrosion inhibitor is located within the adhesion layer), and block 314 corresponds to incorporating a corrosion inhibitor while the carbon film is being deposited (i.e. the corrosion inhibitor is located with the carbon film). Incorporation at these points illustratively improves manufacturing throughput by not requiring an additional or separate process step. In an embodiment, incorporation at this point also generates unique transient species or combinations of corrosion inhibitor molecules and atoms/molecules of the material being deposited (i.e. the adhesion layer material or carbon film material). These species or combinations illustratively enhance the interaction of the corrosion inhibitor with the surface.

Block 313 corresponds to incorporating a corrosion inhibitor after the deposition of the adhesion layer and before the deposition of the carbon film (i.e. the corrosion inhibitor is located between the adhesion layer and the carbon film), and block 315 corresponds to incorporating a corrosion inhibitor after the carbon film is deposited (i.e. the corrosion inhibitor is located on top of the carbon film or overcoat). Incorporation at these points illustratively has the benefit of filling voids or defects in the deposited films. This may reduce locations/paths that corrosive materials could penetrate and thus may provide additional corrosion protection.

Embodiments of the present disclosure are not limited to any particular corrosion inhibitors. Embodiments include any corrosion inhibitor. Corrosion inhibitors are illustratively chemical compounds that through a chemical or electrochemical mechanism reduce the rate of corrosion or prevent corrosion. Corrosion involves a reduction reaction in which a metal gives up or liberates one or more valence electrons, and an oxidation reaction in which another atom or molecule accepts the liberated electron or electrons. Reduction reactions are also known as anodic reactions, and oxidation reactions are also known as cathodic reactions. The combination of an oxidation reaction and a reduction reaction is commonly referred to as an oxidation-reduction reaction.

One group or class of corrosion inhibitors is anodic inhibitors. Anodic inhibitors reduce or prevent corrosion by inhibiting the oxidation reaction. Another group or class of corrosion inhibitors is cathodic inhibitors. Cathodic inhibitors reduce or prevent corrosion by inhibiting the reduction reaction. Embodiments of carbon overcoats incorporating a corrosion inhibitor include one or more anodic inhibitors, one or more cathodic inhibitors, or any combination of anodic and cathodic inhibitors.

As was previously mentioned, embodiments are not limited to any particular corrosion inhibitors and include all corrosion inhibitors and/or combinations of corrosion inhibitors. It is however worthwhile to list some examples of specific corrosion inhibitors that are used in certain embodiments. Illustrative corrosion inhibitors include sodium molybdate ($Na_2MoO_4$), dicyclohexyl ammonium nitrate (($C_6H_{11})_2NH_2NO_2$ or $C_{12}H_{24}N_2O_2$), dicyclohexalamine nitrite (($C_6H_{11})_2NHHNO_2$ or $C_{12}H_{24}N_2O_2$), benzoic acid ($C_7H_6O_2$ or $C_6H_5COOH$), cyclohexyl ammonium benzoate ($C_{13}H_{19}NO_2$), ethanol ammonium benzoate ($C_7H_9NO_2C_2H_5OH$), other derivatives of benzoic acid, triazoles ($C_2H_3N_3$), benzotriazole ($C_6H_5N_3$), and other derivatives of triazoles. Illustrative corrosion inhibitors also include primary amines, secondary amines, amine salts of a primary or secondary amine, nitrate salts of an amine, and nitrite salts of an amine.

Primary and secondary amines are derivatives of ammonia in which one or more hydrogen atom is replaced by an organic substituent such as, but not limited to, an alkyl or an aryl group. In a primary amine, one of the three hydrogens in ammonia is replaced by an organic substituent. A primary amine can be represented by the formula $NH_2R_1$, where $R_1$ is a first organic substituent. In a secondary amine, two of the three hydrogens in ammonia are replaced by organic substituents. A secondary amine can be represented by the formula $NHR_1R_2$, where $R_1$ is a first organic substituent and $R_2$ is a second organic substituent. $R_1$ and $R_2$ can either be the same or different compounds.

Amine salts of a primary or secondary amine are illustratively a primary or secondary amine reacted or combined with an acid such as, but not limited to, a mineral acid. For example, a primary amine ($NH_2R_1$) combines or reacts with hydrochloric acid (HCl) to for an amine salt of a primary amine having the formula $NH_3R_1^+Cl^-$. Similarly, a secondary amine ($NHR_1R_2$) illustratively combines or reacts with hydrochloric acid to form an amine salt of a secondary amine having the formula $NH_2R_1R_2^{+Cl-}$.

Nitrate salts of an amine are illustratively an amine reacted or combined with nitric acid ($HNO_3$). For example, a primary amine ($NH_2R_1$) combines or reacts with nitric acid ($HNO_3$) to form the nitrate salt having the formula $NH_3R_1^+NO_3^-$. Also for example, a secondary amine ($NHR_1R_2$) combines or reacts with nitric acid ($HNO_3$) to form the nitrate salt having the formula $NH_2R_1R_2^+NO_3^-$.

Nitrite salts of an amine are illustratively an amine reacted or combined with nitrous acid ($HNO_2$). For example, a primary amine ($NH_2R_1$) combines or reacts with nitrous acid ($HNO_2$) to form the nitrite salt having the formula $NH_3R_1^+NO_2^-$. Also for example, a secondary amine ($NHR_1R_2$) combines or reacts with nitrous acid ($HNO_2$) to form the nitrite salt having the formula $NH_2R_1R_2^+NO_2^-$.

Embodiments of carbon overcoats incorporating corrosion inhibitors include any amount of corrosion inhibitor. Even a small amount of a corrosion inhibitor in a carbon overcoat reduces a likelihood or rate of corrosion as compared to the same carbon overcoat without any corrosion inhibitor. In one embodiment, for illustration purposes only and not by limitation, a sub-monolayer concentration is used. A monolayer is one atomic or molecular layer (i.e. a layer having a thickness or height of one atom or molecule) that completely covers a surface. A monolayer concentration is a ratio of the number of atoms or molecules in the monolayer to the area of the surface. A sub-monolayer concentration is a concentration that is less than the monolayer concentration. For example, if the monolayer concentration of an atom is 15 atoms per a square nanometer, a sub-monolayer concentration is a concentration less than 15 atoms per a square nanometer. In such a case, if a sub-monolayer concentration is 12 atoms per a square nanometer, the sub-monolayer concentration is illustratively expressed as being 80% of the monolayer concentration. Embodiments include sub-monolayer concentrations between 0 and 100%. In one embodiment, a sub-monolayer concentration of approximately 20% is used.

It is worth noting at this point an additional benefit of incorporating corrosion inhibitors into a carbon overcoat. Corrosion inhibitors have associated vapor pressures. Some corrosion inhibitors have relatively low vapor pressures such that there is a relatively small amount of the material in a gaseous form. If these low vapor pressure corrosion inhibitors were used directly in a data storage system (i.e. placed freely in a data storage system, not combined or contained within another material such as a carbon overcoat), the small amount of the corrosion inhibitor in the vapor phase may not provide sufficient protection against corrosion. However, in certain embodiments of the present disclosure, this is not an issue. The corrosion inhibitors including low vapor pressure materials are directly incorporated into a carbon overcoat and do not rely on the vapor phase or pressure of an inhibitor to reduce or prevent corrosion. This allows for embodiments to use a wider range of materials than could be used otherwise.

Figure 4:
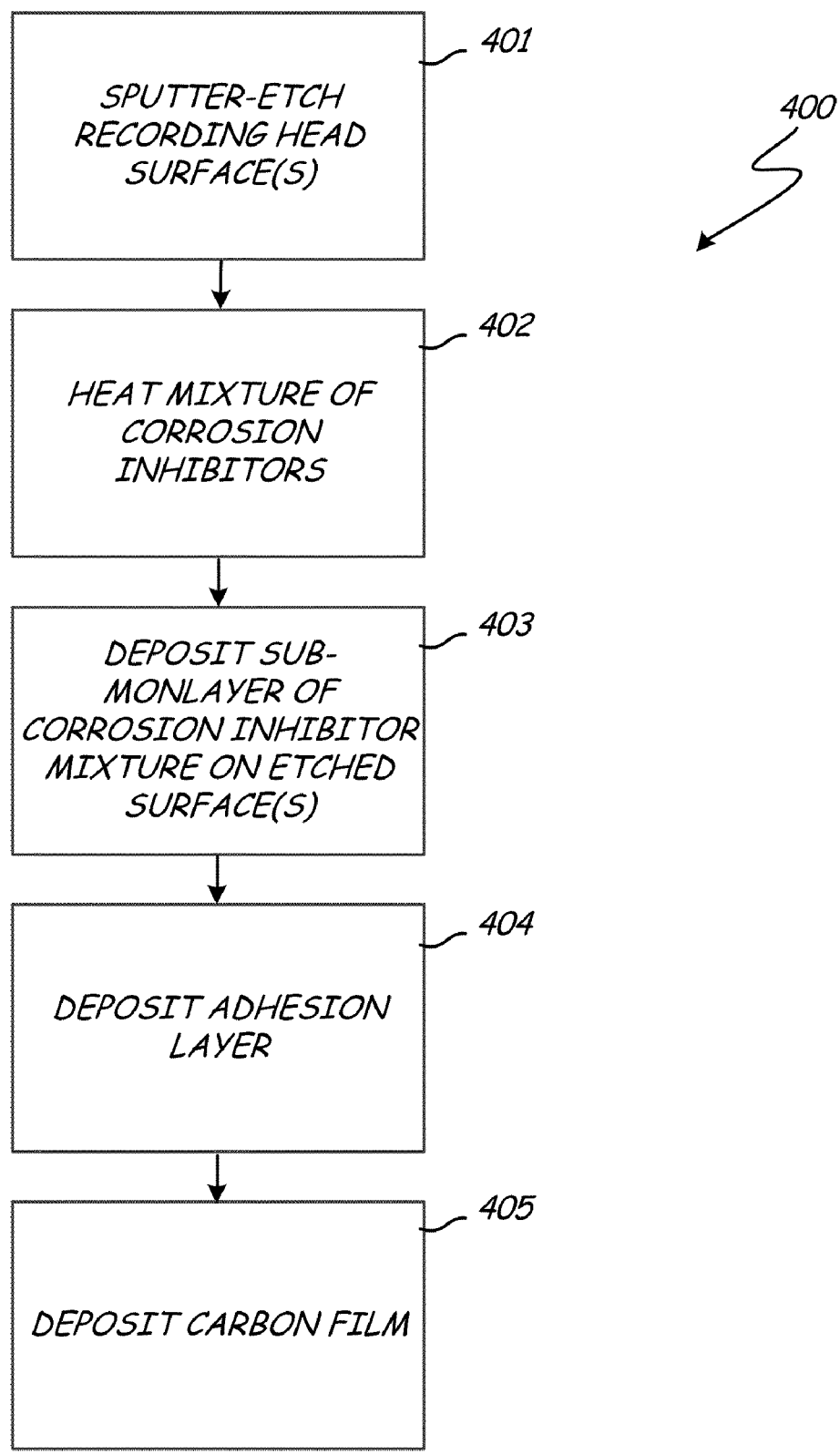
FIG. 4 is a process flow diagram illustrating a specific method of forming carbon overcoats that incorporates corrosion inhibitors.

FIG. 4 is a process flow diagram illustrating one specific embodiment of a process 400 for forming carbon overcoats that incorporate corrosion inhibitors. Process 400 is but one example of a suitable process flow. Embodiments are not limited to process 400 and include process variations and material variations such as, but not limited to, variations previously discussed.

At block 401, one or more surfaces of a recording head are sputter-etched to remove contaminates and oxides. The one or more surfaces illustratively include at least a portion of a recording head read/write component or transducer. The one or more surfaces are illustratively on the air bearing surface side of the recording head.

At block 402, a mixture of corrosion inhibitors is heated. In an embodiment, the mixture of corrosion inhibitors includes cyclohexyl ammonium benzoate, ethanol ammonium benzoate, and benzotriazole, and the mixture is heated to 95° C. This illustratively causes the mixture to evaporate/sublime into a vapor phase.

At block 403, the mixture of corrosion inhibitors in the vapor phase is deposited onto at least a portion of the surface or surfaces that were etched at block 401. The corrosion inhibitors illustratively form a sub-monolayer or have a sub-monolayer concentration. In one embodiment, the sub-monolayer concentration is 20%.

The preceding two paragraphs discussed corrosion inhibitors being deposited utilizing an evaporation and/or sublimation process. Embodiments are not however limited to any particular method or methods of depositing corrosion inhibitors. Other methods to deposit corrosion inhibitors, for illustration purposes only and not by limitation, include sputtering and reactive deposition methods.

At block 404, an adhesion layer is deposited. The adhesion layer illustratively includes silicon or silicon carbon, and has a thickness of between 5 and 7 Angstroms. The adhesion layer illustratively covers at least a portion of the surface that includes corrosion inhibitor deposited at block 403.

At block 405, a carbon layer or film is deposited. The carbon layer illustratively includes diamond-like carbon, and has a thickness of approximately 10 Angstroms. The carbon layer illustratively covers at least a portion of the surface that is covered by the adhesion layer deposited at block 404 and a portion of the surface that includes corrosion inhibitor deposited at block 403.

The carbon overcoat produced by process 400 and the other embodiments previously described illustratively provide increased resistance to corrosion. This allows for the carbon overcoats to have a decreased thickness while maintaining suitable corrosion prevention characteristics. The decreased thickness in turn allows for recording head to recording media spacing to be reduced which commonly enables improved read/write performance. Certain embodiments also provide other advantages such as, but not limited to, enabling a greater variety of corrosion inhibitors to be used in a data storage system.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to hard disc drives, it will be appreciated by those skilled in the art that the teachings of the disclosure can be applied to other types of data storage systems, without departing from the scope and spirit of the disclosure.

What is claimed is:

1. A recording head comprising:
an air bearing surface side;
a carbon overcoat on at least a portion of the air bearing surface side, the carbon overcoat having an adhesion layer between the air bearing surface side and a carbon layer; and
a corrosion inhibitor located between the carbon layer and the air bearing surface side.

2. The recording head of claim 1 wherein a second corrosion inhibitor is located on top of the carbon overcoat.

3. The recording head of claim 1 wherein the corrosion inhibitor is located between the adhesion layer and the carbon layer.

4. The recording head of claim 1 wherein the carbon overcoat comprises diamond-like carbon.

5. The recording head of claim 1 wherein a thickness of the carbon overcoat is less than 20 Angstroms.

6. A recording head comprising:
a carbon overcoat having an adhesion layer and a carbon layer, both the adhesion layer and the carbon layer having voids that provide paths for corrosive elements to penetrate the adhesion and carbon layer; and
a corrosion inhibitor located within the adhesion layer and the carbon layer to fill the voids.

7. The recording head of claim 6 wherein the corrosion inhibitor is selected from a group consisting of sodium molybdate, dicyclohexyl ammonium nitrate, and dicyclohexylamine nitrite.

8. The recording head of claim 6 wherein the corrosion inhibitor is selected from a group consisting of a primary amine, a secondary amine, an amine salt of a primary amine, an amine salt of a secondary amine, a nitrate salt of an amine, and a nitrite salt of an amine.

9. The recording head of claim 6 wherein the corrosion inhibitor is selected from a group consisting of a triazole, benzotriazole, and a derivative of a triazole.

10. The recording head of claim 6 wherein the corrosion inhibitor is selected from a group consisting of benzoic acid, cyclohexyl ammonium benzoate, ethanol ammonium benzoate, and a derivative of benzoic acid.

11. The recording head of claim 6 wherein the corrosion inhibitor is an anodic inhibitor.

12. The recording head of claim 6 wherein the corrosion inhibitor is a cathodic inhibitor.

13. The recording head of claim 6 wherein the corrosion inhibitor has a sub-monolayer concentration.

14. The recording head of claim 6 wherein a thickness of the carbon overcoat is less than 20 Angstroms.

15. The recording head of claim 6, wherein the corrosion inhibitor is located within the adhesion layer.

16. A recording head comprising:
an air bearing surface side;
a carbon overcoat on at least a portion of the air bearing surface side, the carbon overcoat including:
a carbon film having voids that provide paths for corrosive elements to penetrate the carbon film; and
a corrosion inhibitor that fills the voids in the carbon film.

17. The recording head of claim 16 wherein the corrosion inhibitor is an anodic inhibitor.

18. The recording head of claim 16 wherein the corrosion inhibitor is a cathodic inhibitor.

19. The recording head of claim 16 wherein the corrosion inhibitor has a sub-monolayer concentration.

20. The recording head of claim 16, wherein a thickness of the carbon overcoat is less than 20 Angstroms.

* * * * *